United States Patent
Greefkes

(10) Patent No.: US 10,474,851 B2
(45) Date of Patent: *Nov. 12, 2019

(54) SYSTEMS AND METHODS FOR COLLISION AVOIDANCE IN A MULTIPLE RFID INTERROGATOR ENVIRONMENT

(71) Applicant: SMARTRAC TECHNOLOGY FLETCHER, INC., Fletcher, NC (US)

(72) Inventor: Kirk Greefkes, Poway, CA (US)

(73) Assignee: SMARTRAC TECHNOLOGY FLETCHER, INC., Fletcher, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/833,871

(22) Filed: Dec. 6, 2017

(65) Prior Publication Data

US 2018/0096176 A1 Apr. 5, 2018

Related U.S. Application Data

(63) Continuation of application No. 14/704,727, filed on May 5, 2015, now Pat. No. 9,846,794, which is a (Continued)

(51) Int. Cl.
*G06K 7/10* (2006.01)
*G06K 7/00* (2006.01)
*H04W 74/08* (2009.01)

(52) U.S. Cl.
CPC ....... *G06K 7/10019* (2013.01); *G06K 7/0008* (2013.01); *G06K 7/10356* (2013.01); *H04W 74/085* (2013.01)

(58) Field of Classification Search
CPC ............. G06K 7/0008; G06K 19/0723; G06K 7/10039; G06K 7/10356; G06K 7/10019;
(Continued)

(56) References Cited

U.S. PATENT DOCUMENTS

| 4,594,706 A | 6/1986 | Kobayashi |
| 5,796,726 A | 8/1998 | Hassan et al. |

(Continued)

OTHER PUBLICATIONS

Finkenzeller, RFID Handbook: Fundamentals and Applications in Contactless Smart Cards and Identification, Second Edition, 2003, pp. 210-211.

(Continued)

*Primary Examiner* — Nay Tun
(74) *Attorney, Agent, or Firm* — Quarles & Brady LLP

(57) ABSTRACT

A method for collision avoidance in a multi-reader environment comprising a plurality of Radio Frequency Identification (RFID) interrogators, the method comprises each of the plurality of interrogators entering a quiet state during which none of the interrogators transmits, each of the plurality of interrogators selecting a transmit time after the quiet period during which each of the interrogator will attempt to transmit, each of the plurality of interrogators monitoring their associated receive path, an interrogator of the plurality of interrogators transmitting an instruction during its selected transmit time indicating the beginning of a session when the interrogator does not detect data on its receive path prior to its select transmit time, the interrogator comparing its receive path to its transmit path when it transmits the instruction, the interrogator returning to the quiet state when the receive path does not match the transmit path, and the interrogator completing the session when the receive path matches the transmit path.

17 Claims, 5 Drawing Sheets

Related U.S. Application Data continuation of application No. 12/163,643, filed on Jun. 27, 2008, now Pat. No. 9,035,748.

(60) Provisional application No. 60/947,110, filed on Jun. 29, 2007.

(58) Field of Classification Search
CPC .......... G06K 7/10316; G06K 7/10069; G06K 7/10079; G06K 19/07796; G06K 7/101; H04B 5/0062; G06Q 10/087; G08B 13/2488; H04W 84/18; H04W 74/085
See application file for complete search history.

(56) References Cited

U.S. PATENT DOCUMENTS

| | | |
|---|---|---|
| 6,519,229 B1 | 2/2003 | Arai et al. |
| 2003/0137403 A1 | 7/2003 | Carrender et al. |
| 2003/0176198 A1 | 9/2003 | Chisholm |
| 2005/0088284 A1 | 4/2005 | Zai et al. |
| 2006/0022800 A1 | 2/2006 | Krishna et al. |
| 2006/0076401 A1 | 4/2006 | Frerking |
| 2007/0001813 A1 | 1/2007 | Maguire et al. |
| 2007/0139163 A1 | 6/2007 | Powell et al. |

OTHER PUBLICATIONS

Finkenzeller, "RFID Handbook: Fundamentals and Applications in Contactless Smart Cards and Identification," Second Edition, 2003, pp. 208-211.

SYSTEMS AND METHODS FOR COLLISION AVOIDANCE IN A MULTIPLE RFID INTERROGATOR ENVIRONMENT

CROSS-REFERENCE TO RELATED APPLICATIONS

This application is a continuation of U.S. patent application Ser. No. 14/704,727 filed May 5, 2015 which is a continuation of U.S. patent application Ser. No. 12/163,643, filed Jun. 27, 2008, now U.S. Pat. No. 9,035,748, issued May 19, 2015, which claims the benefit under 35 U.S.C. 119(e) of U.S. Provisional Patent Application Ser. No. 60/947,110, filed Jun. 29, 2007, the disclosures of which are incorporated herein by reference in their entirety as if set forth in full.

BACKGROUND

Technical Field

The embodiments described herein relate generally to radio Frequency Identification (RFID), and more particularly to RFID protocols and methods that can be used to avoid collisions among a plurality of interrogators in a single environment.

Related Art

Radio-frequency identification (RFID) is an automatic identification method, relying on storing and remotely retrieving data using devices called RFID tags or transponders. An RFID tag is an object that can be applied to or incorporated into a product, animal, or person for the purpose of identification using radio waves. The data is retrieved from the RFID tags using a reader or interrogator.

Most RFID systems use a modulation technique known as backscatter to enable the tags to communicate with the reader or interrogator. In a backscatter system, the interrogator transmits a Radio Frequency (RF) carrier signal that is reflected by the RFID tag. In order to communicate data back to the interrogator, the tag alternately reflects the RF carrier signal in a pattern understood by the interrogator. In certain systems, the tag can include its own carrier generation circuitry to generate a signal that can be modulated with data to be transmitted to the interrogator.

Most RFID tags contain at least two parts. One is an integrated circuit for storing and processing information, modulating and demodulating a (RF) signal, and other specialized functions. The second is an antenna for receiving and transmitting the signal. As the name implies, RFID tags are often used to store an identifier that can be used to identify the item to which the tag is attached or incorporated. But in today's systems, a RFID tag can contain non-volatile, possibly writable EEPROM for storing additional data as well.

RFID tags come in one of three types: passive, active, and semi passive. Passive RFID tags have no internal power supply. The minute electrical current induced in the antenna by the incoming RF signal from the interrogator provides just enough power for the, e.g., CMOS integrated circuit in the tag to power up and transmit a response. Most passive tags signal by backscattering the carrier wave from the reader. This means that the antenna has to be designed both to collect power from the incoming signal and also to transmit the outbound backscatter signal.

Passive tags have practical read distances ranging from about 10 cm (4 in.) (ISO 14443) up to a few meters (Electronic Product Code (EPC) and ISO 18000-6), depending on the chosen radio frequency and antenna design/size. The lack of an onboard power supply means that the device can be quite small. For example, commercially available products exist that can be embedded in a sticker, or under the skin in the case of low frequency RFID tags.

Unlike passive RFID tags, active RFID tags have their own internal power source, which is used to power the integrated circuits and to broadcast the response signal to the reader. Communications from active tags to readers is typically much more reliable, i.e., fewer errors, than from passive tags.

Active tags, due to their on board power supply, also may transmit at higher power levels than passive tags, allowing them to be more robust in "RF challenged" environments, such as high environments, humidity or with dampening targets (including humans/cattle, which contain mostly water), reflective targets from metal (shipping containers, vehicles), or at longer distances. In turn, active tags are generally bigger, caused by battery volume, and more expensive to manufacture, caused by battery price.

Many active tags today have operational ranges of hundreds of meters, and a battery life of up to 10 years. Active tags can include larger memories than passive tags, and may include the ability to store additional information received from the reader, although this is also possible with passive tags.

Semi-passive tags are similar to active tags in that they have their own power source, but the battery only powers the microchip and does not power the broadcasting of a signal. The response is usually powered by means of backscattering the RF energy from the reader, where energy is reflected back to the reader as with passive tags. An additional application for the battery is to power data storage.

The battery-assisted reception circuitry of semi-passive tags leads to greater sensitivity than passive tags, typically 100 times more. The enhanced sensitivity can be leveraged as increased range (by one magnitude) and/or as enhanced read reliability (by reducing bit error rate at least one magnitude).

The enhanced sensitivity of semi-passive tags place higher demands on the interrogator concerning separation in more dense population of tags. Because an already weak signal is backscattered to the reader from a larger number of tags and from longer distances, the separation requires more sophisticated anti-collision concepts, better signal processing and some more intelligent assessment of which tag might be where.

The collision problem can also affect the readers, or interrogators, i.e., it is possible in certain environments for multiple interrogators to transmit at the same time, which can create communication problems within the system. A RFID interrogator can be considered to be operating in a subset of the following categories:
  a single-reader environment;
  a multiple-reader environment; and
  a dense reader environment.

With respect to the collision problem, in a single-reader static environment, there is no real need for reader arbitration, since there is no other reader to compete against. But, "plug-and-play" flexibility can still be incorporated in the event that another interrogator (or more) is temporarily or permanently added, resulting in a multiple-reader environment.

In multiple, or dense reader environments, it is possible that two or more readers will transmit at the same time. For the purposes of this discussion, a multiple-reader environment is defined to be a single RFID environment with up to 25 readers present. A larger number of readers is considered to form a dense reader environment. Thus, multiple and/or dense reader environments can produce communication problems due to two or more readers transmitting at the same time.

SUMMARY

A process for avoiding interrogator collisions in a multi-reader environment is described herein.

According to one aspect, a method for collision avoidance in a multi-reader environment comprising a plurality of Radio Frequency Identification (RFID) interrogators, the method comprises each of the plurality of interrogators entering a quiet state during which none of the interrogators transmits, each of the plurality of interrogators selecting a transmit time after the quiet period during which each of the interrogator will attempt to transmit, each of the plurality of interrogators monitoring their associated receive path, an interrogator of the plurality of interrogators transmitting an instruction during its selected transmit time indicting the beginning of a session when the interrogator does not detect data on its receive path prior to its select transmit time, the interrogator comparing its receive path to its transmit path when it transmits the instruction, the interrogator returning to the quiet state when the receive path does not match the transmit path, and the interrogator completing the session when the receive path matches the transmit path.

According to another aspect, an RFID interrogator comprises a transmit circuit configured to generate transmit data, a receive circuit configured to decode receive data, a collision detection circuit configured to compare the transmit data with the receive data, a processor coupled with the transmit circuit and the receive circuit, the processor configured to execute instructions, and a memory coupled with the processor, the memory configured to store instructions, the instructions configured to cause the processor to enter a quiet state during which the processor prevent the transmit circuit from generating transmit data, select a transmit time after the quiet period during which the interrogator will attempt to transmit data via the transmit circuit, cause an instruction to be transmit an instruction during the selected transmit time indicting the beginning of a session when the receiver does not detect data on its receive path prior to the select transmit time, return to the quiet state when the collision detection circuit detects that the receive path does not match the transmit path after the instruction is transmitted, and allow the interrogator to complete the session when the collision detection circuit determines that the receive path matches the transmit path after the instruction is transmitted.

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

The basis of the collision avoidance discussed with respect to the embodiments described below can comprise three main aspects 1) verification of a "quiet time", during which no receive activity is detected 2) comparison of the receive and transmit data paths when an instruction is transmitted; and 3) a, e.g., slotted-Aloha approach to the start of the first two reader instructions of a complete instruction set constituting an "interrogator session". Here, an "interrogator session" is not to be confused with session parameters used in the EPC Class 1 Gen 2 protocol.

For example, a quiet period can be inserted prior to the start of any interrogator command set. During this period, interrogators wishing to arbitrate must wait at least a quiet period before attempting to transmit an instruction.

During the period that the first, and possibly the second instruction is being transmitted from an active interrogator, the receive (Rx) and transmit (Tx) data paths can be compared to determine if data collisions are occurring. Hardware implementing a circulator will have Rx and Tx data paths matching each other during this period. Discrete Rx & Tx data paths, i.e., no Tx feedback into the Rx data path are handled by ensuring that no data is detected on the Rx data path while an instruction is being transmitted.

To avoid multiple arbitrating readers from transmitting at the same time, and even worse, transmitting the exact same message, each reader can be configured to randomly choose a slot in which to start transmitting. Each reader can then be configured to wait for its slot before transmission, during which time it can be configured to continuously detect the presence of other arbitrating interrogators by monitoring the Rx data path. The detection of another interrogator during this period can remove the waiting reader from the current arbitration round, forcing the reader to wait for the next consecutive interrogator session.

For example, a slotted-Aloha algorithm can be applied, such that each reader will be configured to randomly choose a slot in which to start responding.

Figure 1:
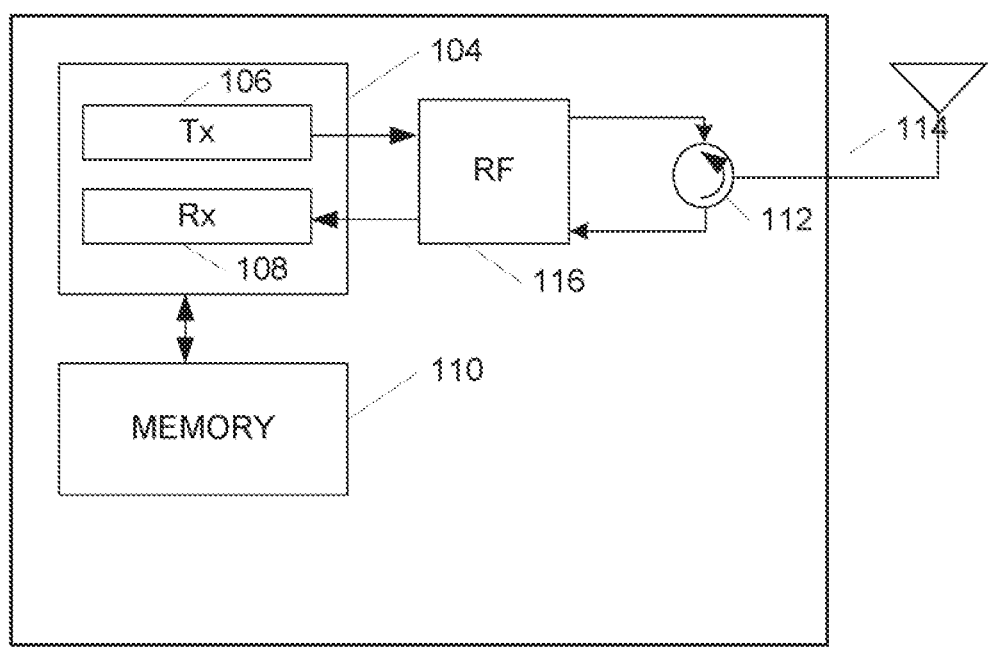
FIG. 1 is a diagram illustrating an example RFID interrogator in accordance with one embodiment.

FIG. 1 is a block diagram illustrating an example RFID interrogator 102. As can be seen, the interrogator 102 can comprise a baseband circuit 104, a memory 110, a RF circuit 116, a circulator 112, and an antenna 114.

The baseband circuit 104 can comprise the digital circuitry necessary to perform the functions required of RFID interrogator 102. Thus, baseband circuit 104 can comprise processing circuitry (not shown) configured to execute instructions, e.g., stored in memory 110, which control the operation of the RFID interrogator and logic circuits (not shown) configured to implement those instructions and/or provide input to the processing circuitry. Further, baseband circuitry 104 can include transmit (Tx) and receive (Rx) data logic and encoder circuitry 106 and 108 respectively. The Tx circuitry 106 can be configured to generate and encode data to be transmitted via antenna 114. The Rx circuitry 108 can be configured to receive and decode data received via signals received by antenna 114.

It will be understood that the baseband circuitry can comprise one or more processors, micro-processors, digital signal processors, math co-processors, logic circuits, etc. Moreover, it will be understood that the various processors and circuits can be included in a single die or multiple die, and where multiple die are used, the multiple die can be packaged in a single package or multiple packages. It will also be understood that all or some of baseband circuitry 104 can be implemented as part of an Application Specific Integrated Circuit (ASIC), or that "off-the shelf" components can be used depending on the implementation.

Memory 110 can be used to store instructions used by the baseband circuit 104 to perform the functions needed to operate the interrogator 102, e.g., to perform the Tx and Rx functions.

It will be understood that memory 110 can comprise one or more memory circuits or devices configured to provide permanent storage as well as non-permanent storage. Moreover, it will be understood that at least some portions of memory 110 can be included in the same package as at least some portions of the processing circuitry. Alternatively, all or some of the circuits comprising memory 110 can be packaged separately as one or more chips, or as can be part of one or more separate die. It will also be understood that in certain embodiments, hard drives, removable drives, flash drives, etc., can also be included in interrogator 104 and as part of memory 110.

RF circuit 116 can comprise the RF front end circuitry needed to convert the baseband Tx data to a signal that can be transmitted via antenna 114, and convert data included on signals received via antenna 114 into baseband Rx data that can be processed by Rx circuitry 108. Thus, RF circuit 116 can comprise the digital-to-analog circuits, modulators, up-converters, amplifiers, filters, etc., needed to convert the Tx baseband data to signal that can be transmitted by antenna 114. RF circuit 116 can also comprise the filters, amplifiers, down-converters, digital-to-analog circuits, etc., need to convert data included on signals received via antenna 114 to baseband Rx data.

Antenna 114 can be configured to transmit and receive RF signals. In the example, of FIG. 1, a single antenna is used for both Tx and Rx. As such, a circulator 112 is included in order to separate the Rx and Tx signal paths. A circulator is a passive electronic component that can be used to connect a single antenna to both an Rx and Tx port.

It will be understood, however that in other embodiments, separate antenna can be used for the Rx and Tx paths. In such instances, a circulator is not needed.

Figure 2:
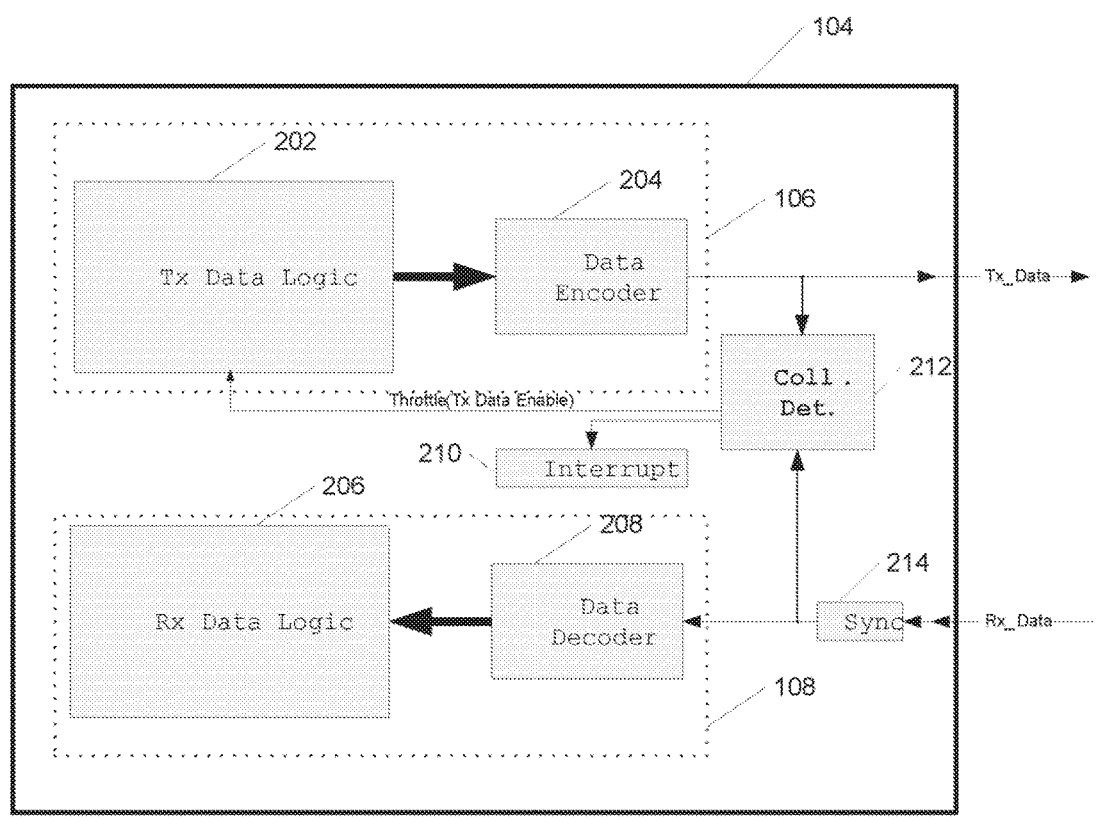
FIG. 2 is a diagram illustrating an baseband processing circuit that can be included in the interrogator of FIG. 1.

FIG. 2 is a diagram illustrating baseband circuit 104 in more detail. As can be seen, the Tx circuitry 106 can comprise Tx data logic 202 and a Tx data encoder 204, and that Rx circuitry 108 can comprise Rx data logic 206 and Rx data encoder 208.

In addition, baseband circuit 104 can comprise interrupt circuit 210 and collision detection circuit 112. As described in detail below, during arbitration, if collisions are detected between data being transmitted and data being received, then interrupt circuit 210 can be configured to generate an interrupt signal, allowing the processing circuitry to cease transmitting. Alternatively, the use of a throttle signal, generated, e.g., by the collision detection circuit 212 can be used to enable/disable transmission, negating the need for interrupt circuit 210.

Figure 3:
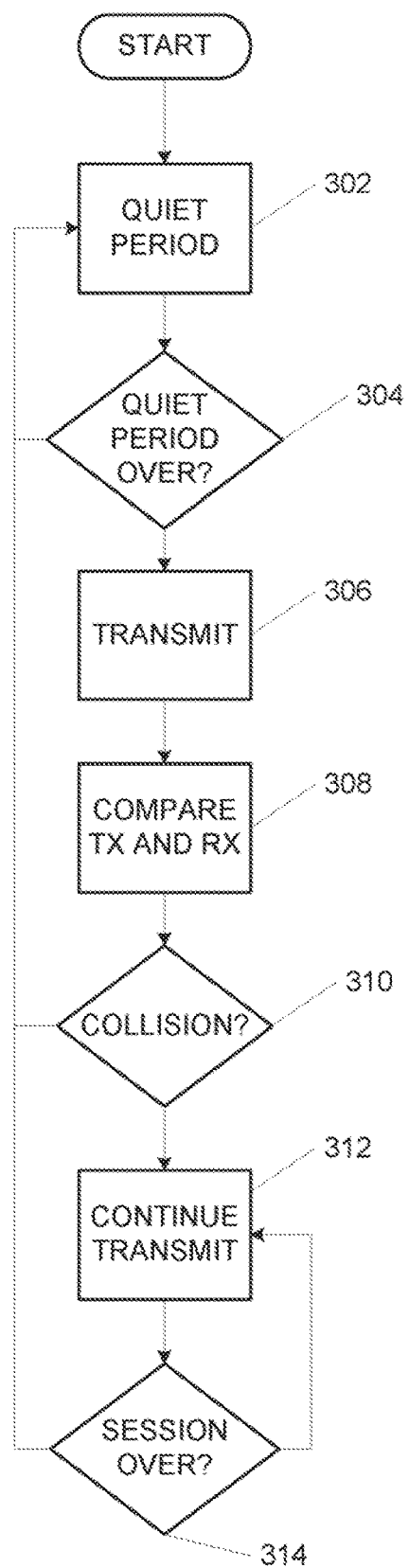
FIG. 3 is a flow chart illustrating an example process for collision avoidance that can be implemented when the interrogator of FIG. 1 is operating in a multi-interrogator environment in accordance with one embodiment.

FIG. 3 is a diagram illustrating an example method for avoiding collisions in a multi-reader/interrogator environment in accordance with one embodiment. It should be noted that the method illustrated in FIG. 3 can also be implemented in a dense reader environment; however, it may be preferable to implement an even more robust method when a large number of interrogators are present. For the purposes of the discussion that follows, it is assumed that a multiple-reader environment is defined to be a single RFID environment with up to 25 readers present. But it will be understood that more interrogators can also be present depending on the implementation.

In step 302, each interrogator wishing to arbitrate will enter an initial state in which it will wait for a predetermined period termed the quiet period. In step 306, a particular interrogator will attempt to transmit an instruction if it is determined in step 304 that the quiet period has ended. In step 308, the transmitting interrogator will compare the Rx and Tx paths to see if there is a collision. If it is determined in step 310 that there is a collision, then the interrogator will be removed from the current arbitration round, forcing the interrogator to return to initialization step 302 to wait for the next consecutive interrogator session.

If no collision is detected in step 310, then the interrogator can continue the session in step 312. Once the session is complete, as determined in step 314, the interrogator can return to initialization step 302.

As will be described in more detail below, when the interrogator attempts to transmit (step 306), the interrogator can be forced to select a transmission slot from a plurality of transmission slots. For example, a slotted-Aloha arbitration scheme can be implemented. The implementation of the logic to perform slotted-Aloha arbitration should be done in a generic manner, such that the same logic can be used regardless of the communication protocol being implemented.

In order to implement the process illustrated in FIG. 3, several sub-processes are required. The first is a control process implemented in an upper-level application layer that directly controls each interrogator. This requires an additional level of complexity to the application layer, and requires complete knowledge of the associated RFID infrastructure. The second process incorporates the, e.g., slotted-Aloha arbitration process in the lower-level, physical interface layer. This approach imposes no requirements on each discrete interrogator, or the application layer for that matter, on the operating environment, or the number of other interrogators in its RF field. Furthermore, the arbitration process can easily be disabled in the event a control process is implemented. The arbitration process is the focus of the discussion that follows.

The arbitration process can include: a set of reader instructions, e.g., stored in memory 110, comprising an "interrogator session"; a "quiet period", where no interrogators transmit; and a slotted-time-division-multiplexed period of time that each discrete interrogator randomly uses for transmission.

Figure 4:
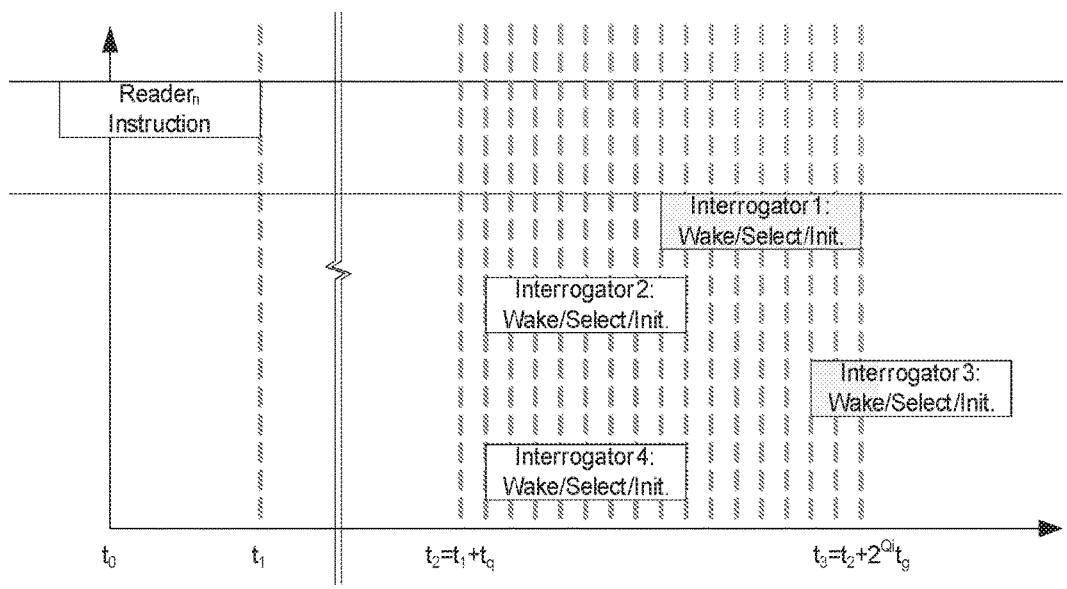
FIG. 4 is a session diagram illustrating an example session that can be implemented in accordance with the process illustrated in FIG. 3.

A visual representation of example interrogator arbitration is shown in FIG. 4. As can be seen, Reader$_n$ is shown transmitting its final instruction at time $t_0$, ending/closing its interrogator session at time $t_1$. Following this period is a "quiet time" (step 324) defined by $t_q$, a period during which no interrogators are to transmit. Time $t_2$ defines the start of an n-slot interrogator arbitration period, where n is defined by the parameter $Q_i$: $n=2^{Q_i}$. Arbitrating interrogators (four shown in FIG. 4) select a slot to respond in, and then wait for that slot prior to transmission. In the event that an arbitrating reader detects data transmission prior to its slot (step 310), it loses arbitration, returning to an initial state to wait for a quiet time (step 302). The winning interrogator continues with its new session (step 312), while all other interrogators wait for a start of a new session, defined by the end of the previous session (step 314) and a quiet time (step 302).

Thus, an interrogator session begins with the first reader instruction being transmitted (step 306) during a, e.g., slotted-Aloha period, and ends when the final instruction of the winning reader is transmitted (step 314), followed by a "quiet time" (step 302). During an interrogator session, all other interrogators in the RF field are to remain quiet, such that they do not interfere. A session comprises all instructions from a unique RFID reader to a RFID tag, or a multitude of RFID tags, and includes all responses from the tag(s) required to fulfill the physical protocol.

From the perspective of the winning interrogator as shown in FIG. 4, its session shall end at time $t_1$; from the perspective of all other arbitrating interrogators, a session shall start at time $t_2$ plus any arbitration time prior to transmission of the first instruction.

It should be noted that each interrogator should only use the bandwidth that it requires, such that its session does not unnecessarily use a long period of time, forcing the remaining readers to wait.

The quiet period can be a defined guard band that all readers shall detect as the start of a, e.g., slotted-Aloha arbitration period. The quiet period should take into account the longest period of time between consecutive reader instructions. This is usually defined by the RFID tag's maximum write time plus a nominal offset value. For example, for ISO 18000-6C (Gen2) tags, this time can be up to 20 ms.

As mentioned, the interrogator arbitration should be performed through some form of slotted transmission scheme, such as a slotted-Aloha scheme. In other words, interrogator arbitration should be performed through a scheme that allows the first responding interrogator to commence an interrogator session without interference from other readers.

There are several arbitration metrics that should be considered, such as slot size, number of slots, interrogator priority, multiple "winning" interrogators, etc.

Depending on the embodiment, the slot size shall be a fixed value, defined by:

the lowest bit rate;
the minimum number of bits per slot; and
the arbitration tolerance.

For example, if the lowest interrogator data rate is 40 kb/s, the bit period shall be 25 μs. If two bits per slot and 5% tolerance are required, the slot size would be 52.5 μs.

The number of slots should be configurable and determined by the anticipated number of interrogators in the RF environment. The parameter $Q_i$ can be used to set the number of slots n, much in the same manner the Gen 2 parameter "Q" sets the number of tag response slots. As such, the number of slots can be defined by: $n=2^{Q_i}$.

In some environments, it can be necessary to establish an interrogator priority scheme, whereby certain readers have priority over others "most of the time", or "all of the time". Even in these cases, the rules for waiting for the start of the arbitration round should apply. This can be the case, for example, when hand-held readers are in occasional use with permanent readers.

Interrogator priority can be established by forcing the arbitrating reader to respond in a subset of slots. Higher priority readers can arbitrate in the first slot or several slots, while lower priority readers can arbitrate in later slots. In general, a weighting scheme can be implemented into the arbitration processes described herein in a variety of different ways.

It can also be desirable to ensure that the same reader does not win back-to-back arbitration rounds. This can be accomplished by including an additional guard band beyond the quiet time, equal to the arbitration time. This would guarantee that any other readers would have priority over the reader that executed the previous session.

Due to the random nature of the arbitration processes described herein, it is entirely possible that two or more interrogators select the same slot to initiate an interrogator session. To accommodate this, two additional states can be included in the interrogator startup as shown in the state diagram of FIG. 5. During the transmission of the first instruction, the collision logic continues to search for collisions by comparing the Rx and Tx data paths (step 308). If no collisions have occurred, then there are two possible outcomes: a single reader has won arbitration, or a multitude of readers have transmitted the exact same message at the same time. To deal with the latter case, two additional states are included to attempt to detect collisions: 1) introduce an additional random guard band inserted between the first and second interrogator instructions, and 2) transmit the second instruction, again performing collision detection.

Figure 5:
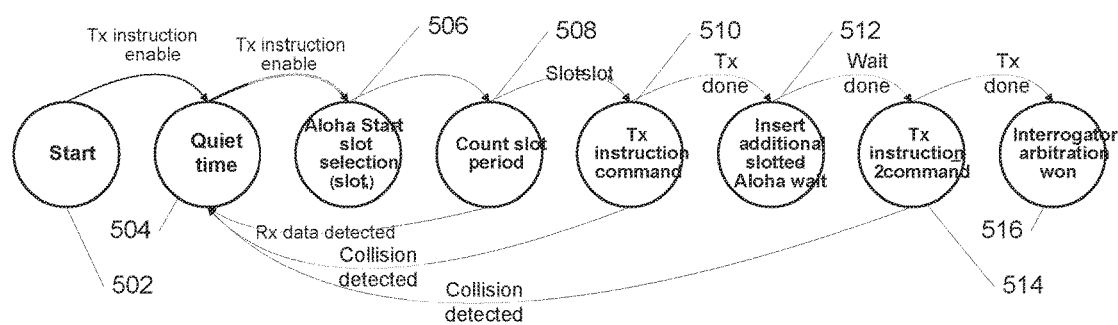
FIG. 5 is a state diagram illustrating one example implementation of the process illustrated in FIG. 3.

FIG. 5 depicts a finite state machine that can be implemented in all readers to accomplish interrogator arbitration as describe above. The state machine begins in state 502 and transitions to state 504 when a Tx enable instruction is received. In state 504, the interrogator will wait for the quiet period to end and then transition to state 506 in which it will randomly select a transmission slot. In state 508, the interrogator will wait for its slot to come up, which will cause a transition to state 510 in which the interrogator will start transmitting the first instruction, as illustrated in FIG. 4.

If, however, the interrogator detects Rx data while in state 508, i.e., while it is waiting for its slot to come up, then it has lost the arbitration and this will cause a transition back to state 504. Also, if a collision is detected when the interrogator transmits the first instruction is state 510, then this will also cause a transition back to state 504.

In certain embodiments, to protect against the situation where multitude of readers have transmitted the exact same message at the same time, the state machine can transition to state 512, where it waits a certain period of time before transitioning to state 514 in which the second instruction is transmitted. In state 514, the interrogator again looks for collisions and if a collision is detected, then this causes a transition to state 504. If no collision is detected, then the interrogator has won the arbitration.

Referring again to FIGS. 1 and 2, collision detection occurs via an interrogator 102 examining the receive path to determine if 'another' interrogator is also transmitting. Thus, by comparing the receive path to the transmit path, an interrogator can determine if another interrogator is also transmitting at the same time. There are two situations to consider: 1) where a single antenna 114 is included in interrogator 102, and 2) where separate Tx and Rx antenna are included.

In this first situation, a circulator 112 will be included in interrogator 102. In this case, the transmitted data is sent through circulator 112 to antenna 114. The circulator 112 in turn returns the transmitted data and any data received by antenna 114. The result is that when no data is present at antenna 114, i.e., no data is received by antenna 114, then the data returned by circulator 112 will equal the transmitted data. Should the data returned by circulator 112 include modulated data, whether from a tag or from another interrogator, the two data paths will not be equal, indicating a collision.

In the second situation, i.e., separate Tx and Rx antenna, the result of the comparison is effectively the same as above, except now the Rx path should have no modulation whatsoever when the interrogator is the only interrogator transmitting. Again, like above, if in fact data modulation is detected on the Rx path in the presence of Tx data, whether the Rx data is from a tag or interrogator, a collision can be deemed to have occurred.

The implementation of the logic is to be done such that it is "protocol-neutral". The logic would examine transmit and receive data, most easily performed by simply independently counting the number of edges on the Tx and Rx data paths while an instruction is being transmitted. In the event that collisions are occurring, the number of data toggles on the Rx path would exceed the data toggle count on the Tx data path. Furthermore, the introduction of noise can be compensated for by differentiating the two count values, then using a threshold value to determine if the difference is due to noise or other interrogator data.

The additional logic required to implement the above is illustrated in FIG. 2. Other than a possible inclusion of the throttle signal, the logic itself remains unchanged. In fact, no change is required if an interrupt was generated to the processor interface in the event of a collision.

Thus, the embodiments described herein provide systems and methods to eliminate or minimize interrogator collisions from occurring that can be implemented regardless of the RFID protocol being implemented. Collision detection can be performed by independently examining receive and transmit data paths. The data on both paths should be the same if a circulator is used in the external hardware; in the event that the two data paths are completely independent of one another, then there should be no activity on the receive data path at all when an instruction is transmitted. To avoid collisions, a slotted-Aloha implementation can be used, enabling discrete interrogators to randomly start transmitting at various times during the reader arbitration phase. Once a reader has "won arbitration", it continues with its "interrogator session" until it has completed its PHY task.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed is:

1. A radio frequency identification (RFID) interrogator disposed in a multiple-interrogator environment, comprising:
a transmit (Tx) circuit configured to transmit encoded data on a Tx path;
a receive (Rx) circuit configured to decode received data received via a Rx path;
a collision detection circuit configured to detect a data collision on one of the Tx path and the Rx path based on a comparison of the Rx path and the Tx path; and
a processor coupled to the collision detection circuit, the Tx circuit, and the Rx circuit, and configured to
cause the RFID interrogator to enter a quiet state, the quiet state defining a predetermined time period in which the Tx circuit ceases transmission,
cause the Tx circuit to transmit a first message of the plurality of messages at a first time after expiration of the predetermined time period, if the collision detection circuit does not detect a data collision at or before the first time,
cause the RFID interrogator to return to the quiet state when the collision detection circuit detects a data collision at or before the first time,
selecting a second time at which the Tx circuit begins transmitting a second message of the plurality of messages the second time being after the first time;
cause the RFID interrogator to return to the quiet state when the collision detection circuit detects a data collision at or before the second time, and
cause the Tx circuit to transmit a remainder of the plurality of messages when the collision detection circuit does not detect a data collision at or before the second time.

2. The RFID interrogator of claim 1, wherein processor is further configured to cause the RFID interrogator to return to the quiet state after the Tx circuit transmits the remainder of the plurality of messages.

3. The RFID interrogator of claim 2, wherein the RFID interrogator remains in the quiet state for a length of time determined based at least in part on an arbitration time.

4. The RFID interrogator of claim 1, wherein the first time comprises a start of a first timeslot randomly selected from a plurality of timeslots.

5. The RFID interrogator of claim 4, wherein the second time comprises a start of a second timeslot randomly selected from the plurality of timeslots.

6. The RFID interrogator of claim 4, wherein a duration of each timeslot of the plurality of timeslots is determined based on at least one of:
a bit rate of one or more interrogators in the multiple interrogator environment;
a number of interrogators in a multiple or dense interrogator environment; and
a minimum number of data bits per timeslot, and an arbitration tolerance.

7. The RFID interrogator of claim 1, further comprising:
an antenna coupled to the Tx circuit and the Rx circuit; and
a circulator coupling the Tx circuit and the Rx circuit to the antenna, and configured to separate the Tx path from the Rx path to the antenna,
wherein the collision detection circuit is further configured to detect a data collision when the data on the Tx path is not equal to the data on the Rx path.

8. The RFID interrogator of claim 1, further comprising:
a Tx antenna coupled to the Tx circuit; and
an Rx antenna coupled to the Rx circuit and separate from the Tx circuit,
wherein the collision detection circuit is configured to detect a data collision when data is detected on the Rx path.

9. A method for operating a radio frequency identification (RFID) interrogator disposed in a multiple-interrogator environment, the RFID interrogator having a transmit (Tx) circuit having a Tx path, a receive (Rx) circuit having a Rx path, and a collision detection circuit coupled to the Tx path and the Rx path and configured to detect a data collision on one of the Tx path and the Rx path based on a comparison of the Rx path and the Tx path, the method comprising:
causing, by a processor, the RFID interrogator to enter a quiet state for a predetermined time period during which the Tx circuit ceases transmission on the Tx path;

selecting, by the processor, a first time after the predetermined time period to transmit encoded data on the Tx path;

cause the Tx circuit to transmit a first message of the plurality of messages at a first time after expiration of the time period, if the collision detection circuit does not detect a data collision at or before the first time;

cause the RFID interrogator to return to the quiet state when the collision detection circuit detects a data collision at or before the first time, cause the RFID interrogator to return to the quiet state when the collision detection circuit detects a data collision at or before a second time at which the Tx circuit begins transmitting a second message of the plurality of messages on the Tx path, the second time being after the first time; and cause the Tx circuit to transmit a remainder of the plurality of messages when the collision detection circuit does not detect a data collision at or before the second time.

10. The method of claim 9, further comprising causing the RFID interrogator to return to the quiet state after the Tx circuit transmits the remainder of the plurality of messages.

11. The method of claim 10, further comprising the RFID interrogator to remain in the quiet state for a length of time determined based at least in part on an arbitration time.

12. The method of claim 9, wherein the first time comprises a start of a first timeslot randomly selected from a plurality of timeslots.

13. The method of claim 12, wherein the second time comprises a start of a second timeslot randomly selected from the plurality of timeslots.

14. The method of claim 12, wherein a duration of each timeslot of the plurality of timeslots is determined based on at least one of:
- a bit rate of one or more interrogators in the multiple interrogator environment;
- a number of interrogators in a multiple or dense interrogator environment; and
- a minimum number of data bits per timeslot, and an arbitration tolerance.

15. The method of claim 9, further comprising:
separating the Tx path from the Rx path, by a circulator coupled to the Tx circuit and the Rx circuit, wherein the Tx circuit and the Rx circuit are coupled to an antenna; and detecting, by the collision detection circuit, a data collision when the data on the Tx path is not equal to the data on the Rx path.

16. The method of claim 9, further comprising detecting, by the collision detection circuit, a data collision when data is detected on the Rx path, wherein the Tx circuit is coupled to a Tx antenna and the Rx circuit is coupled to an Rx antenna separate from the Tx circuit.

17. The method of claim 9, further comprising returning to the quiet state when the Rx path does not match the Tx path.

* * * * *